United States Patent Office 2,755,989
Patented July 24, 1956

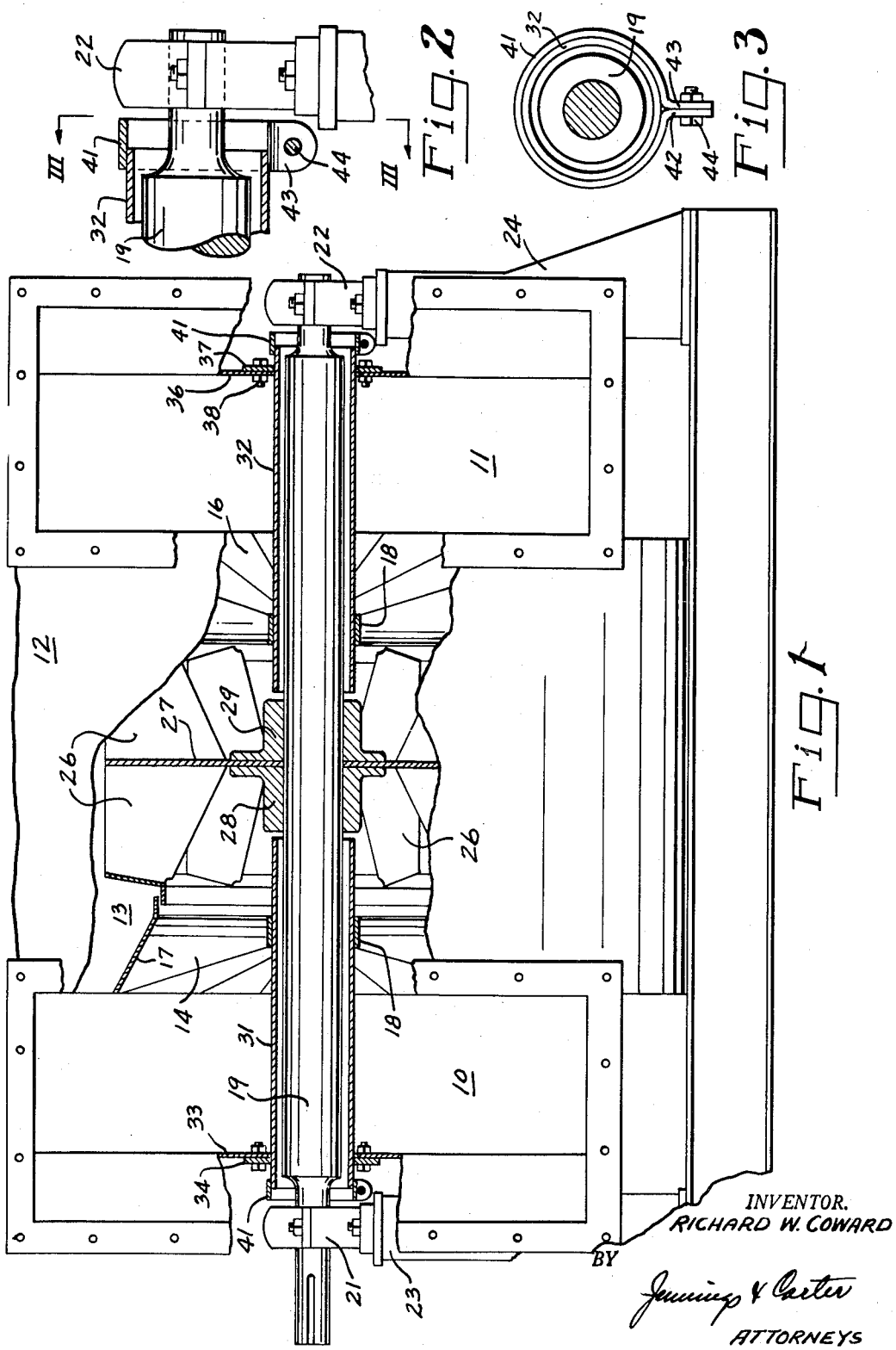

2,755,989

COOLING SYSTEM FOR SHAFTS AND BEARINGS

Richard W. Coward, Birmingham, Ala.

Application October 1, 1952, Serial No. 312,495

3 Claims. (Cl. 230—128)

This invention relates to fans or blowers which are required to handle hot gases and has for an object the provision of means, in such apparatus, for maintaining the bearings at proper working temperatures.

A further object of my invention is to provide improved means for cooling the shaft of a blower or fan handling hot gases to minimize the transmission of heat to its bearings.

A more specific object of my invention is to provide improved means for circulating cooling air around the shaft and bearings of a fan or blower handling hot gases, which shall be effective to cool the shaft and bearings without unnecessarily diluting and cooling the gases being handled.

Heretofore in the art to which my invention relates it has been the custom to cool the bearings of exhaust fans or blowers by circulating water or oil around the bearings or through the shaft. The use of water has met with difficulties in cold climates due to freezing; and where oil is employed a separate cooling system must be provided for the oil. It has also been proposed to introduce cool air into the blower around the shaft to cool the shaft and thus minimize the transmission of heat to the bearings, but all such means with which I am familiar introduce an undue amount of air and thus dilute and cool the gases being handled and decrease the amount of heat which otherwise might be recovered from the gases.

The foregoing and other difficulties are overcome by means of my invention wherein I provide a sleeve surrounding the blower shaft with a relatively close clearance through which a limited amount of outside cooling air is drawn. The close clearance between the sleeve and shaft produces pronounced turbulence in the air flowing therethrough and thus the maximum of cooling effect. Also, the sleeve is so positioned that the induced cool air drawn through it sweeps over the bearings and cools them. The sleeve is rigidly supported at its outer end through which the cool air is drawn and is slidingly supported at its inner end to allow for contraction and expansion in response to changes in temperature. I also provide means for varying the volume of air entering the tube whereby to adjust the amount of cooling to which the shaft is subjected.

Apparatus including features of my invention is illustrated in the accompanying drawing, forming a part of this application in which:

Fig. 1 is an elevational view, partly in section, and with parts broken away, showing a typical blower having my invention incorporated therein;

Fig. 2 is a detail sectional view, drawn to a larger scale, showing one of the bearings and the adjacent end of the cooling tube; and, Fig. 3 is a sectional view taken along the line III—III of Fig. 2.

Referring to the drawing for a better understanding of my invention, I show a blower including a casing having two inlet boxes 10 and 11, one on each side thereof, an outlet 12, and a scroll case or impeller housing 13. Inlet vanes 14 and 16 are positioned on opposite sides of the impeller case or housing 13 each being supported by an outer conical band 17 and an inner band 18. Extending through the inlet boxes 10 and 11 and impeller housing 13 is a shaft 19 which is mounted in bearings 21 and 22 which, in turn, are supported on pedestals 23 and 24 on opposite sides of the inlet boxes. Mounted in the housing 13 is an impeller having blades 26 supported from a central disc 27 and hub members 28 and 29 mounted on the shaft 19.

All of the foregoing is typical of blowers of this class which handle exhaust gases from furnaces and, as is well known in the art, unless some means is provided for cooling the bearings 21 and 22, or cooling the shaft 19 so that it does not transmit excessive heat to the bearings, the bearings will soon become hot and be damaged to such an extent as to require their replacement.

In accordance with my invention, I provide a pair of cooling sleeves 31 and 32 which surround the shaft 19 with a relatively close clearance and which extend from outside the inlet boxes 10 and 11 to a point adjacent the hub members 28 and 29. The sleeve 31 is fixedly mounted in the outer wall 33 of the inlet box 10 by means of a ring 34 which is welded or otherwise fixedly secured to the sleeve and which is bolted to the wall 33. In a similar manner, the sleeve 32 is fixedly secured to the outer wall 36 of the inlet box 11 by means of a ring 37 mounted on the sleeve and secured to the wall 36 by means of bolts 38.

The inner end of the sleeve 31 is slidingly supported in the inner ring 18 which supports the inlet vanes 14. Likewise, the inner end of the sleeve 32 is slidingly supported in the inner ring 18 which supports the inlet vanes 16. In this way the sleeves 31 and 32 are permitted to expand and contract responsive to changes in temperature.

As will be seen from the drawing, the sleeves 31 and 32 both extend outside the inlet boxes 10 and 11 so that when the fan is in operation, cool air is drawn through the sleeves into the interior of the fan housing. Due to the close clearance between the sleeve and the shaft, the amount of air so drawn in is limited and the turbulence created by this close clearance creates the greatest efficiency in cooling. The air drawn in sweeps over the bearings 21 and 22 and aids in cooling them.

In order to regulate the amount of air passing through the sleeves 31 and 32 I provide each of them with an adjustable collar 41 which is clamped around the sleeves by being provided with two ears 42 and 43 which are drawn together by means of a bolt 44. By moving the collar 41 toward or away from the bearings 21 and 22, the amount of cool air entering the housing may be limited to that necessary to cool the bearings 21 and 22 and hub members 28 and 29, and thus minimize the dilution of the heated gases being handled by the blower.

From the foregoing it will be apparent that I have devised an improved means for cooling the bearings of fans and blowers handling hot gases which is simple and economical of design and effective for the purpose.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a centrifugal blower having a lateral inlet box, an outlet, an impeller, inlet vanes between the inlet box and the impeller, an impeller shaft extending through the inlet box and a bearing mounted outside the inlet box and rotatably supporting the shaft, means for cooling the bearing comprising a sleeve surrounding the shaft with relatively close clearance and extending through the inlet box to a point adjacent the bearing and terminating adjacent the impeller, means fixedly mounting the outer end of the sleeve on the inlet box, means carried by the inlet vanes slidingly supporting the inner end of the sleeve, and means for varying the clearance between said sleeve and said bearing.

2. In a centrifugal blower for handling hot gases and having laterally spaced inlet boxes, an impeller casing between the inlet boxes, a shaft extending through said casing and both inlet boxes, an impeller mounted on the shaft within the casing, bearings mounted outside the inlet boxes and rotatably supporting the shaft and an outlet passageway between the inlet boxes, means for cooling the bearings comprising sleeves surrounding the shaft with relatively close clearance on both sides of the impeller and each extending from a point adjacent the impeller through one of said inlet boxes to a point adjacent the bearing on that side, means fixedly securing the outer end of each sleeve to its associated inlet box, inlet vanes mounted on opposite sides of the impeller casing, and supporting rings secured to the inner portion of said inlet vanes and surrounding the inner ends of the sleeves with a sliding fit.

3. In a centrifugal blower for handling hot gases and having laterally spaced inlet boxes, an impeller casing between the inlet boxes, a shaft extending through said casing and both inlet boxes, an impeller mounted on the shaft within the casing, bearings mounted outside the inlet boxes and rotatably supporting the shaft, and an outlet passageway between the inlet boxes, means for cooling the bearings comprising sleeves surrounding the shaft with relatively close clearance on both sides of the impeller and each extending from a point adjacent the impeller through one of said inlet boxes to a point adjacent the bearing on that side, means fixedly securing the outer end of each sleeve to its associated inlet box, inlet vanes mounted on opposite sides of the impeller casing, supporting rings secured to the inner portion of said inlet vanes and surrounding the inner ends of the sleeves with a sliding fit, a collar surrounding the outer end of each sleeve, and means holding said collar in selected positions relative to its associated bearing whereby the clearance between the collar and its bearing is varied.

References Cited in the file of this patent

UNITED STATES PATENTS

| 100,238 | Sturtevant | Feb. 22, 1870 |
| 616,590 | Seymour | Dec. 27, 1898 |
| 1,858,837 | Messer | May 17, 1932 |
| 2,635,016 | Doniak | Apr. 14, 1953 |
| 2,665,059 | Newton | Jan. 5, 1954 |

FOREIGN PATENTS

| 536,397 | Germany | Dec. 30, 1930 |